United States Patent
Kameoka

(10) Patent No.: US 11,780,424 B2
(45) Date of Patent: Oct. 10, 2023

(54) VEHICLE CONTROL DEVICE AND VEHICLE CONTROL METHOD

(71) Applicant: Mitsubishi Electric Corporation, Tokyo (JP)

(72) Inventor: Shota Kameoka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/762,741

(22) PCT Filed: Dec. 6, 2019

(86) PCT No.: PCT/JP2019/047807
§ 371 (c)(1),
(2) Date: Mar. 23, 2022

(87) PCT Pub. No.: WO2021/111616
PCT Pub. Date: Jun. 10, 2021

(65) Prior Publication Data
US 2022/0340123 A1    Oct. 27, 2022

(51) Int. Cl.
*B60W 30/02*    (2012.01)
*B60W 30/10*    (2006.01)
*B60W 40/06*    (2012.01)

(52) U.S. Cl.
CPC ............ *B60W 30/02* (2013.01); *B60W 30/10* (2013.01); *B60W 40/06* (2013.01);
(Continued)

(58) Field of Classification Search
CPC ....... B60W 30/02; B60W 30/10; B60W 40/06
See application file for complete search history.

(56) References Cited

U.S. PATENT DOCUMENTS

| 4,836,319 A | 6/1989 | Haseda et al. | |
| 2020/0073405 A1* | 3/2020 | Xu | B60W 60/001 |
| 2020/0142405 A1* | 5/2020 | Havens | G05D 1/0212 |

FOREIGN PATENT DOCUMENTS

| JP | 63-28763 A | 2/1988 |
| JP | 10-119807 A | 5/1998 |
| JP | 2004-143974 A | 5/2004 |

OTHER PUBLICATIONS

International Search Report and Written Opinion dated Feb. 25, 2020, received for PCT Application PCT/JP2019/047807, Filed on Dec. 6, 2019, 8 pages including English Translation.

(Continued)

*Primary Examiner* — Imran K Mustafa
(74) *Attorney, Agent, or Firm* — XSENSUS LLP

(57) ABSTRACT

In a vehicle control device, a switching hyperplane generation unit generates a switching hyperplane based on a travel state of a vehicle and cornering stiffness dependent on a travel surface state as a state of a road surface on which the vehicle travels. A deviation computation unit calculates a deviation between a target trajectory and an actual trajectory of the vehicle. A state estimation unit estimates a state to be controlled of the vehicle based on the deviation calculated by the deviation computation unit. A target steering angle and acceleration/deceleration computation unit calculates a target steering angle and a target acceleration/deceleration rate of the vehicle based on the switching hyperplane generated by the switching hyperplane generation unit and an estimated state as the state estimated by the state estimation unit.

21 Claims, 14 Drawing Sheets

(52) U.S. Cl.
CPC ... *B60W 2510/20* (2013.01); *B60W 2510/222* (2013.01); *B60W 2520/105* (2013.01); *B60W 2520/20* (2013.01); *B60W 2555/20* (2020.02); *B60W 2710/20* (2013.01); *B60W 2720/10* (2013.01)

(56) References Cited

OTHER PUBLICATIONS

Kenzo et al., "Sliding Mode Control—Design Theory of Non-Liner Robust Control", Colona Publishing Co., Ltd., 1994, 9 pages including partial English Translation.
Berntorp et al., "Tire-Stiffness Estimation by Marginalized Adaptive Particle Filter", IEEE 55th Conference on Decision and Control (CDC), Dec. 12-14, 2016, pp. 2443-2448.

* cited by examiner

FIG. 7

| INDEX | TRAVEL SURFACE STATE | $C_f$ [N/rad] | $C_r$ [N/rad] |
|---|---|---|---|
| 1 | ICY SURFACE | 33000 | 36000 |
| 2 | WET SURFACE | 35000 | 40000 |
| 3 | DRY SURFACE | 41000 | 48000 |

VEHICLE CONTROL DEVICE AND VEHICLE CONTROL METHOD

CROSS-REFERENCE TO RELATED APPLICATION

The present application is based on PCT filing PCT/JP2019/047807, filed Dec. 6, 2019, the entire contents of which are incorporated herein by reference.

TECHNICAL FIELD

The present invention relates to vehicle control devices to control travel of vehicles and vehicle control methods.

BACKGROUND ART

As a method for achieving automatic travel of a vehicle, a method of generating a target trajectory representing a target path and a target vehicle speed over a future period of time, calculating a target steering angle and a target acceleration/deceleration rate for causing the vehicle to follow the target trajectory, and controlling an actual steering angle and actual acceleration/deceleration of the vehicle according to the target steering angle and the target acceleration/deceleration rate as calculated has been proposed.

As a vehicle control method, a sliding mode control method of constraining (maintaining) a state of a vehicle on a plane (also referred to as a switching function) referred to as a switching hyperplane designed on a phase space to achieve a robust control system is known. For example, Patent Document 1 discloses technology of applying the sliding mode control method to steering control by correcting the switching hyperplane according to a travel state (e.g., a vehicle speed) of a vehicle to thereby suppress overshoot of the vehicle.

PRIOR ART DOCUMENT

Patent Document

Patent Document 1: Japanese Patent Application Laid-Open No. 63-028763

SUMMARY

Problem to be Solved by the Invention

Technology disclosed in Patent Document 1 takes into account the vehicle speed, but does not take into account a state of a road surface (travel surface) on which the vehicle travels at determination of the switching hyperplane, and thus can cause deterioration of a capability of following a target trajectory when the vehicle travels on a slippery travel surface, for example.

The present invention has been conceived to solve a problem as described above, and it is an object to achieve robust vehicle control not only on a travel state of a vehicle but also on a state of a travel surface.

Means to Solve the Problem

A vehicle control device according to the present invention includes: a switching hyperplane generation unit to generate a switching hyperplane based on a travel state of a vehicle and cornering stiffness dependent on a travel surface state as a state of a road surface on which the vehicle travels; a deviation computation unit to calculate a deviation between a target trajectory and an actual trajectory of the vehicle; a state estimation unit to estimate a state to be controlled of the vehicle based on the deviation calculated by the deviation computation unit; and a control input computation unit to calculate a control input for controlling at least one of steering and a vehicle speed of the vehicle based on the switching hyperplane generated by the switching hyperplane generation unit and an estimated state as the state estimated by the state estimation unit.

Effects of the Invention

According to the present invention, robust vehicle control can be achieved on the travel state of the vehicle and the travel surface state.

The objects, features, aspects, and advantages of the present invention will become more apparent from the following detailed description and the accompanying drawings.

BRIEF DESCRIPTION OF DRAWINGS

FIG. 7 shows a table representing a correspondence between an index of a travel surface state and cornering stiffness.

DESCRIPTION OF EMBODIMENTS

Embodiment 1

Figure 1:
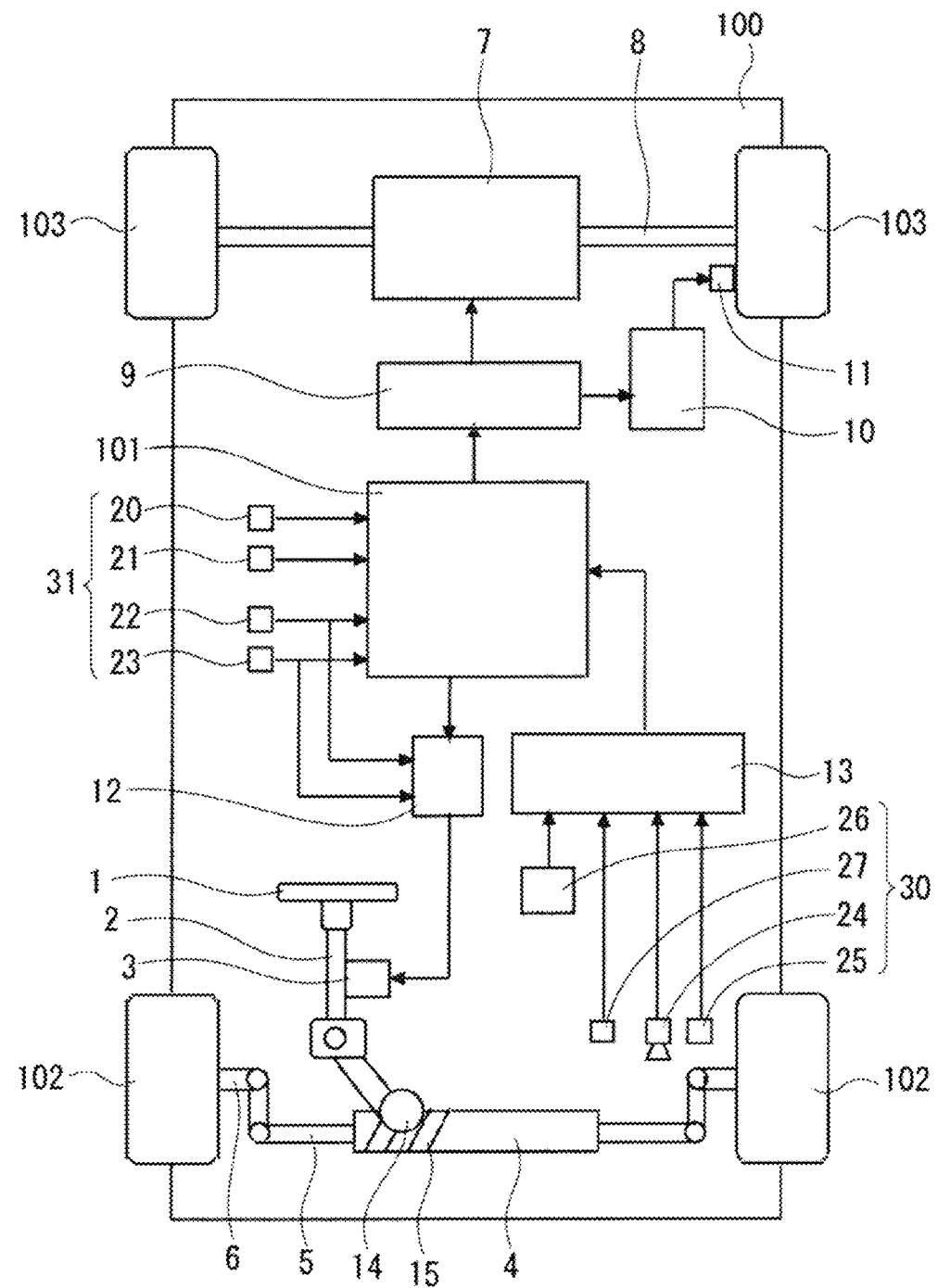
FIG. 1 shows an example of a configuration of a control system of a vehicle on which a vehicle control device is mounted.

A configuration of a control system of a vehicle will be described first with reference to FIG. 1. A steering wheel 1 to be used by a driver (i.e., an operator) to steer a vehicle 100 is connected to a steering shaft 2. A pinion shaft 14 of a rack and pinion mechanism 4 is linked to the steering shaft 2. A rack shaft 15 of the rack and pinion mechanism 4 can reciprocate in response to rotation of the pinion shaft 14, and front knuckles 6 are connected to left and right ends of the rack shaft 15 through tie rods 5. The front knuckles 6 pivotally support front wheels 102 as steering wheels, and are supported by a vehicle frame to be turnable.

A torque generated by the driver operating the steering wheel 1 rotates the steering shaft 2, and the rack and pinion mechanism 4 moves the rack shaft 15 to the left and right in response to rotation of the steering shaft 2. Due to movement of the rack shaft 15, the front knuckles 6 pivot around a kingpin axis (not illustrated), and thus the front wheels 102 are turned to the left and right. Thus, the driver can change the amount of lateral movement of the vehicle 100 by operating the steering wheel 1 when the vehicle 100 travels forward and rearward.

As an internal sensor 31 to recognize a travel state of the vehicle 100, a vehicle speed sensor 20, an inertial measurement device 21 (hereinafter, referred to as an inertial measurement unit (IMU) sensor 21), a steering angle sensor 22, a steering torque sensor 23, and the like are installed in the vehicle 100.

The vehicle speed sensor 20 includes a pulse sensor to detect a rotation speed of wheels of the vehicle 100, converts an output of the pulse sensor into a vehicle speed value, and outputs the vehicle speed value. The IMU sensor 21 is installed on a roof of the vehicle 100 or in the vehicle 100, and detects an acceleration rate and an angular velocity of the vehicle 100 in a vehicle coordinate system. The IMU sensor 21 sometimes includes a micro electric mechanical system (MEMS), a fiber optic gyroscope, and the like incorporated therein, for example. The vehicle coordinate system is herein a coordinate system fixed to a chassis or a body of the vehicle. The vehicle coordinate system typically has the center of gravity of the vehicle as its origin, and a forward direction along a longitudinal direction of the vehicle is taken as an x axis, a leftward direction of the vehicle is taken as a y axis, and a direction in which a right-handed thread rotating from the x axis in a direction of the y axis advances is taken as a z axis.

The steering angle sensor 22 is a sensor to measure a rotation angle of the steering shaft 2, and is configured by a rotary encoder, for example. The steering torque sensor 23 is a sensor to measure a rotation torque of the steering shaft 2, and is configured by a strain gauge, for example.

As an external sensor 30 to recognize a condition around the vehicle 100, a camera 24, a radar 25, a global navigation satellite system (GNSS) sensor 26, a navigation device 27, and the like are installed in the vehicle 100.

The camera 24 is installed at a location where an image in front of the vehicle 100 can be captured, and acquires, from the captured image, information indicating an environment in front of the vehicle 100, such as information on a lane, line markings, an obstacle (e.g., another vehicle and a pedestrian), and the like in front of the vehicle 100. In the present embodiment, the camera 24 outputs, as the information of the line markings, a result of representation of the line markings using a polynomial, a spline curve, and the like. The radar 25 performs radar illumination forward of the vehicle 100, detects a reflected wave thereof to measure a relative distance to and a relative speed of an obstacle present in front of the vehicle 100, and outputs a result of measurement. The other vehicle detected by the camera 24 and the radar 25 includes not only a vehicle (leading vehicle) traveling in front of the vehicle 100 but also a vehicle (stopping vehicle) stopping around the vehicle 100.

A GNSS antenna, which is not illustrated, is connected to the GNSS sensor 26, and the GNSS sensor 26 receives a positioning signal from a positioning satellite orbiting on a satellite orbit via the GNSS antenna, analyzes the received positioning signal, and outputs information on the location (e.g., latitude, longitude, a height, and an azimuth direction) of a phase center of the GNSS antenna. The positioning satellite includes the US global positioning system (GPS), the Russian global navigation satellite system (GLONASS), the European Galileo, the Japanese quasi-zenith satellite system (QZSS), the Chinese Beidou, and the Indian navigation Indian constellation (NavIC). The GNSS sensor 26 may use any of them.

The navigation device 27 has a function of calculating an optimum travel route from a current location of the vehicle 100 to a destination set by the driver and a function of storing road information on the travel route. The road information is map node data representing a road line shape, and information on an absolute location (latitude, longitude, and altitude) of each node, a lane width, a cant angle, an inclination angle, and the like is incorporated in the map node data.

The external sensor 30 and the internal sensor 31 are connected to a network (not illustrated), such as a controller area network (CAN), of the vehicle 100, and any other devices connected to the network can acquire information output from the external sensor 30 and the internal sensor 31. In the present embodiment, all the sensors included in the external sensor 30 and the internal sensor 31 are connected to the network, and can mutually transmit and receive data.

A trajectory generation device 13 calculates a target path on which the vehicle 100 is to travel and a target vehicle speed that the vehicle 100 is to follow over a future period of time based on outputs of the external sensor 30 and the internal sensor 31, and outputs a result of calculation to a vehicle control device 101. The target path and the target vehicle speed are hereinafter collectively referred to as a target trajectory. That is to say, the target trajectory is information representing the target path and the target vehicle speed at each point on the target path.

Figure 2:
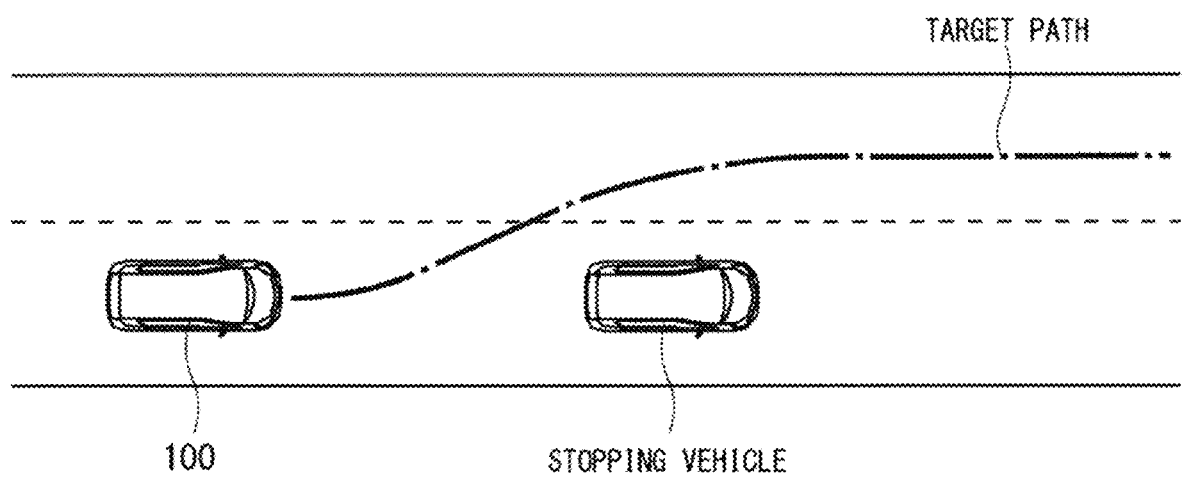
FIG. 2 shows an example of a target path calculated by a trajectory generation device.

For example, when the external sensor 30 detects the stopping vehicle present in front of the vehicle 100, the trajectory generation device 13 calculates the target path of the vehicle 100 as shown in FIG. 2 based on a result of detection. The target path in FIG. 2 is to cause the vehicle 100 to change lanes to avoid the stopping vehicle. The trajectory generation device 13 calculates the target vehicle speed of the vehicle 100 so that the vehicle 100 changes lanes while decelerating in view of the possibility that the stopping vehicle will suddenly start moving.

The vehicle control device 101 calculates a target steering angle and a target acceleration/deceleration rate based on outputs of the internal sensor 31 and the external sensor 30 so that the vehicle 100 follows the target path and the target vehicle speed acquired from the trajectory generation device 13. The vehicle control device 101 outputs the calculated target steering angle to a steering control device 12, and outputs the calculated target acceleration/deceleration rate to an acceleration/deceleration control device 9.

An electric motor 3 to achieve motion in a lateral direction (lateral motion) of the vehicle 100, a vehicle drive device 7 to control motion in a longitudinal direction (longitudinal motion) of the vehicle 100, and an actuator, such as a brake 11, are installed in the vehicle 100.

The electric motor 3 typically includes a motor and a gear, and provides a torque to the steering shaft 2 to freely rotate the steering shaft 2. That is to say, the electric motor 3 can freely turn the front wheels 102 independently of operation of the steering wheel 1 performed by the driver.

The steering control device 12 calculates a current value to be supplied to the electric motor 3 to cause steering of the vehicle 100 to follow the target steering angle based on outputs of the steering angle sensor 22, the steering torque sensor 23, and the like and the target steering angle output from the vehicle control device 101, and applies a current corresponding to the calculated current value to the electric motor 3.

The vehicle drive device 7 is an actuator to drive the vehicle 100 in the longitudinal direction. The vehicle drive device 7 transfers a driving force obtained by a drive source, such as an engine and a motor, to the front wheels 102 or rear wheels 103 through a transmission and a shaft 8 to rotate the front wheels 102 or the rear wheels 103. The vehicle drive device 7 can thus freely control the driving force of the vehicle 100.

On the other hand, a brake control device 10 is an actuator to brake the vehicle 100, and controls an amount of braking of the brake 11 installed in each of the front wheels 102 and the rear wheels 103 of the vehicle 100. The brake 11 typically generates a braking force by pressing a pad against a disc rotor rotating together with the front wheels 102 and the rear wheels 103 using hydraulic pressure.

The acceleration/deceleration control device 9 calculates the driving force and the braking force of the vehicle 100 required for an acceleration rate of the vehicle 100 to follow the target acceleration/deceleration rate output from the vehicle control device 101, and outputs a result of calculation to the vehicle drive device 7 and the brake control device 10.

A sliding mode control method will herein briefly be described for ease of understanding of the present embodiment.

The sliding mode control method is a method of causing a state (e.g., a distance from or an angle with respect to the target path and time derivatives thereof) to be controlled to reach a switching hyperplane having preset stable dynamics and maintaining the state on the switching hyperplane to control a control target. The switching hyperplane is typically designed using a state equation indicating dynamics of the control target.

When the state is maintained on the switching hyperplane, the state transitions to slide to a stable point, and thus this state is referred to as a sliding mode. It is theoretically proved that the state is robust against modeling errors and disturbances when being in the sliding mode. The sliding mode control method is a method of determining a control input so that the state is maintained in the sliding mode, that is, on the switching hyperplane.

Figure 3:
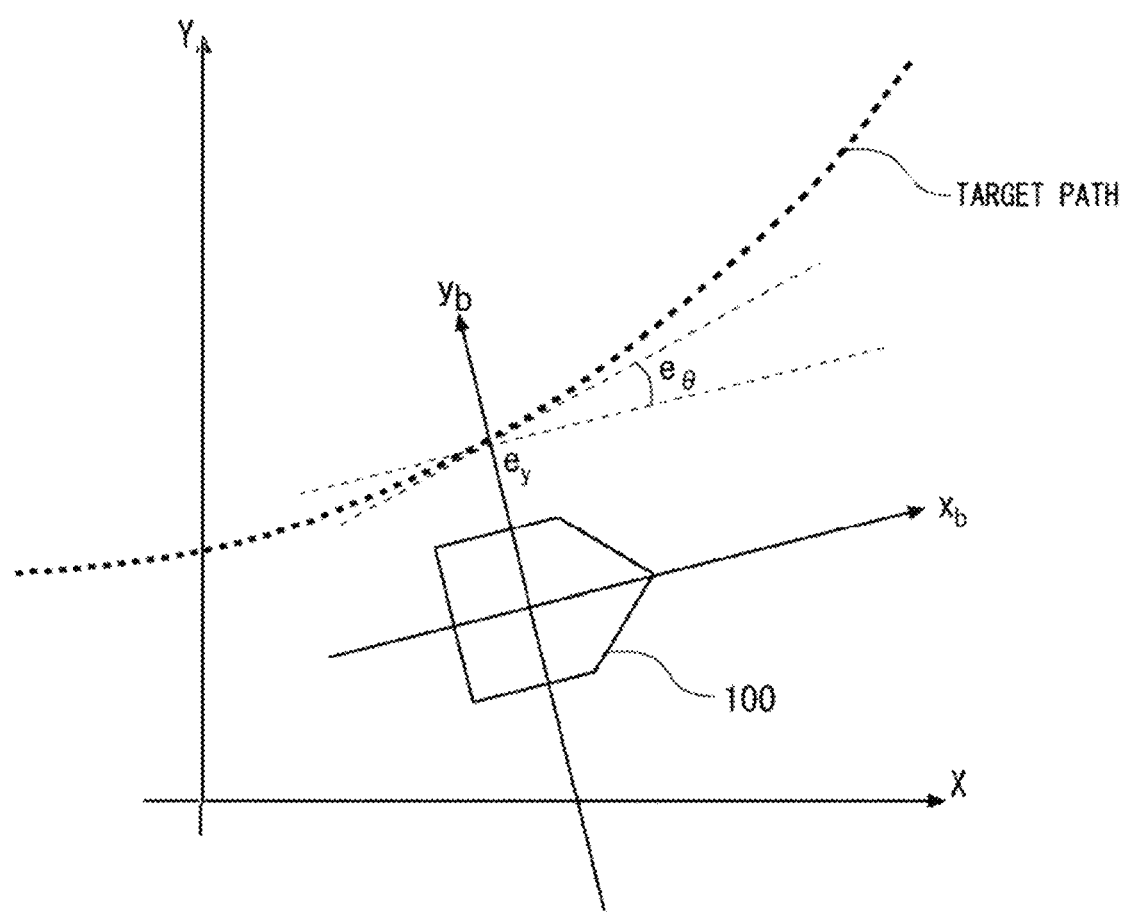
FIG. 3 is a diagram for describing a lateral deviation and a deflection angle of the vehicle with respect to the target path.

A state equation like an equation (1) shown below can typically be used, where $e_y$ is a lateral deviation of a point of the center of gravity of the vehicle 100 with respect to the target path, and $e_\theta$ is a deflection angle of a direction of travel of the vehicle 100 with respect to the target path as shown in FIG. 3. In the equation (1), a dot "˙" above a variable means a time derivative. A prime "′" added to a variable also means a time derivative below.

[Math 1]

$$\frac{d}{dt}\begin{bmatrix} e_y \\ \dot{e}_y \\ e_\theta \\ \dot{e}_\theta \end{bmatrix} = \begin{bmatrix} 0 & 1 & 0 & 0 \\ 0 & -\dfrac{2C_f + 2C_r}{mv_x} & \dfrac{2C_f + 2C_r}{m} & \dfrac{-2C_fL_f + 2C_rL_r}{mv_x} \\ 0 & 0 & 0 & 1 \\ 0 & -\dfrac{2C_fL_f - 2C_rL_r}{I_z v_x} & \dfrac{2C_fL_f - 2C_rL_r}{I_z} & -\dfrac{2C_fL_f^2 + 2C_rL_r^2}{I_z v_x} \end{bmatrix} \begin{bmatrix} e_y \\ \dot{e}_y \\ e_\theta \\ \dot{e}_\theta \end{bmatrix} + \begin{bmatrix} 0 \\ \dfrac{2C_f}{m} \\ 0 \\ \dfrac{2C_f l_f}{I_z} \end{bmatrix} \delta \quad (1)$$

$v_x$: vehicle speed [m/s]
$\delta$: steering angle [rad]
m: total mass of vehicle [kg]
$L_f$: distance between center of gravity and front wheel axis [m]
$L_r$: distance between center of gravity and rear wheel axis [m]
$I_z$: moment of inertia about yaw axis [kg·m$^2$]
$C_f$: front wheel stiffness [N/rad]
$C_r$: rear wheel stiffness [N/rad]
$e_y$: lateral deviation from center of gravity of vehicle to target path [m]
$e_\theta$: deflection angle from center of gravity of vehicle to target path [rad]

When the switching hyperplane is designed using the state equation as the equation (1), and control is performed so that $e_y$, $e_\theta$, $e_y'$, and $e_\theta'$ are each zero, the vehicle 100 follows the target path. The equation (1) is represented by an equation (3) using equations (2) below.

[Math 2]

$$x_l = \begin{bmatrix} e_y & \dot{e}_y & e_\theta & \dot{e}_\theta \end{bmatrix}^T \quad (2)$$

$$A_l(v_x, C_f, C_r) := \begin{bmatrix} 0 & 1 & 0 & 0 \\ 0 & -\dfrac{2C_f + 2C_r}{mv_x} & \dfrac{2C_f + 2C_r}{m} & \dfrac{-2C_fL_f + 2C_rL_r}{mv_x} \\ 0 & 0 & 0 & 1 \\ 0 & -\dfrac{2C_fL_f - 2C_rL_r}{I_z v_x} & \dfrac{2C_fL_f - 2C_rL_r}{I_z} & -\dfrac{2C_fL_f^2 + 2C_rL_r^2}{I_z v_x} \end{bmatrix}$$

$$B_l(C_f, C_r) := \begin{bmatrix} 0 \\ \dfrac{2C_f}{m} \\ 0 \\ \dfrac{2C_f l_f}{I_z} \end{bmatrix}$$

[Math 3]

$$\dot{x}_l = A_l(v_x, C_f, C_r)x_l + B_l(C_f, C_r)\delta \quad (3)$$

As can be seen from the equation (1), the motion in the lateral direction (lateral motion) of the vehicle 100 is dependent on a vehicle speed $v_x$ as the motion in the longitudinal direction (longitudinal motion) of the vehicle 100, and dynamics of the vehicle 100 differ at a low speed and at a high speed. The switching hyperplane is typically designed so that $v_x$ is constant, but, when the vehicle speed changes, control performance can be improved by changing the switching hyperplane depending on the vehicle speed. In Patent Document 1 described above, overshoot of the vehicle and the like are suppressed by changing the switching hyperplane depending on the vehicle speed.

Figure 4:
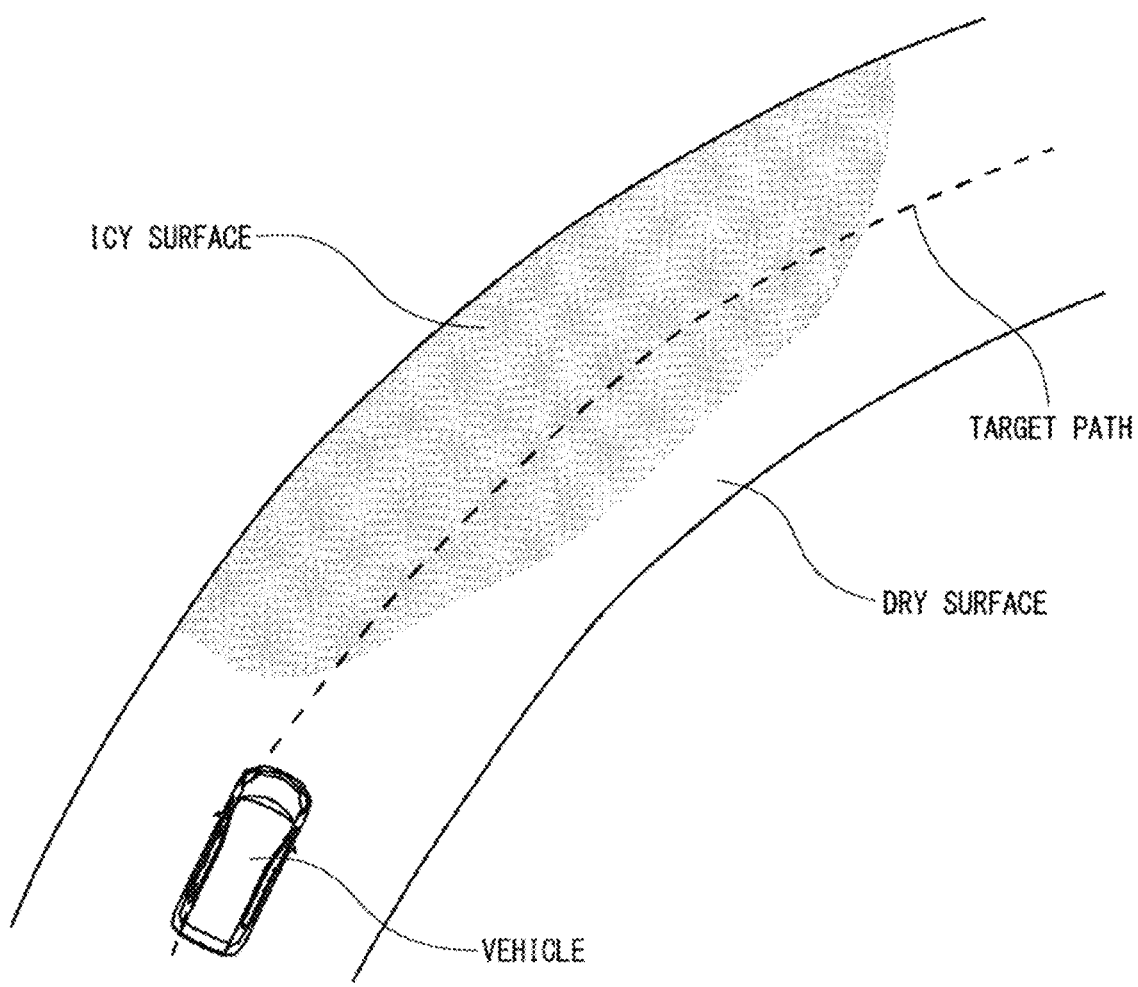
FIG. 4 shows an example of a case where the vehicle is destabilized.

Even when the switching hyperplane is changed depending on the vehicle speed as described in Patent Document 1, however, control performance is deteriorated, and, at worst, the vehicle 100 is destabilized in some cases. This is, for example, a case where an icy road surface (icy surface) is present on the target path of the vehicle 100 as shown in FIG. 4.

Figure 5:
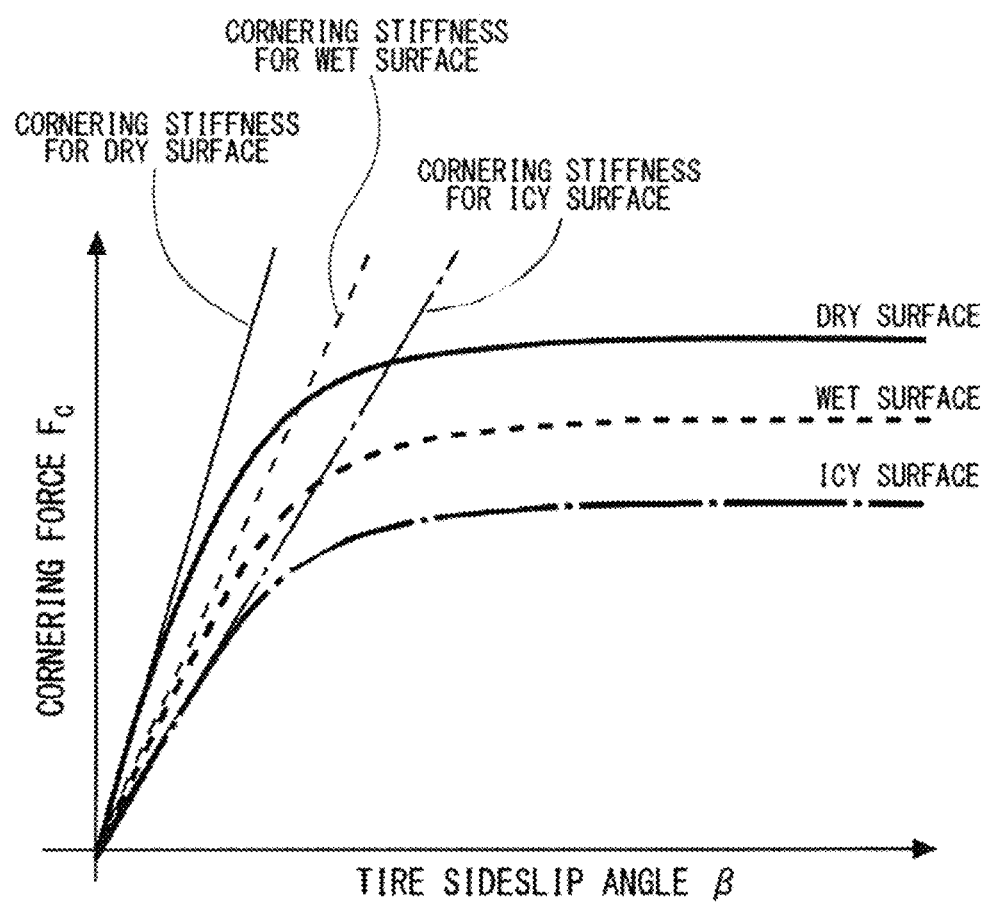
FIG. 5 is a graph showing a relationship between a tire sideslip angle and a cornering force.

FIG. 5 is a graph showing a relationship between a tire sideslip angle and a cornering force. The vehicle 100 achieves the lateral motion using the cornering force generated by the front wheels 102 and the rear wheels 103. The cornering force is related to the tire sideslip angle, and differs depending on whether the road surface is a dry road surface (dry surface), a wet road surface (wet surface), or the icy road surface (icy surface) as shown in FIG. 5.

While $C_f$ and $C_r$ in the equation (1) are each cornering stiffness, a value of the cornering stiffness changes depending on a state of the road surface as shown in FIG. 5 because the cornering stiffness is defined as a slope of the cornering force when the tire sideslip angle is zero (i.e., a change rate of the cornering force with respect to the tire sideslip angle). Thus, when the vehicle 100 controlled using $C_f$ and $C_r$ when the road surface is the dry surface travels on the icy surface, for example, the state cannot reach the switching hyperplane, and the vehicle 100 can be destabilized. Patent Document 1 fails to take this into account.

In the present embodiment, the vehicle control device 101 that can achieve robust sliding mode control on the travel state, such as the vehicle speed, of the vehicle and the road surface (travel surface) on which the vehicle travels by changing the switching hyperplane while taking into account not only a change of the travel state but also a change of the travel surface is proposed.

Figure 6:
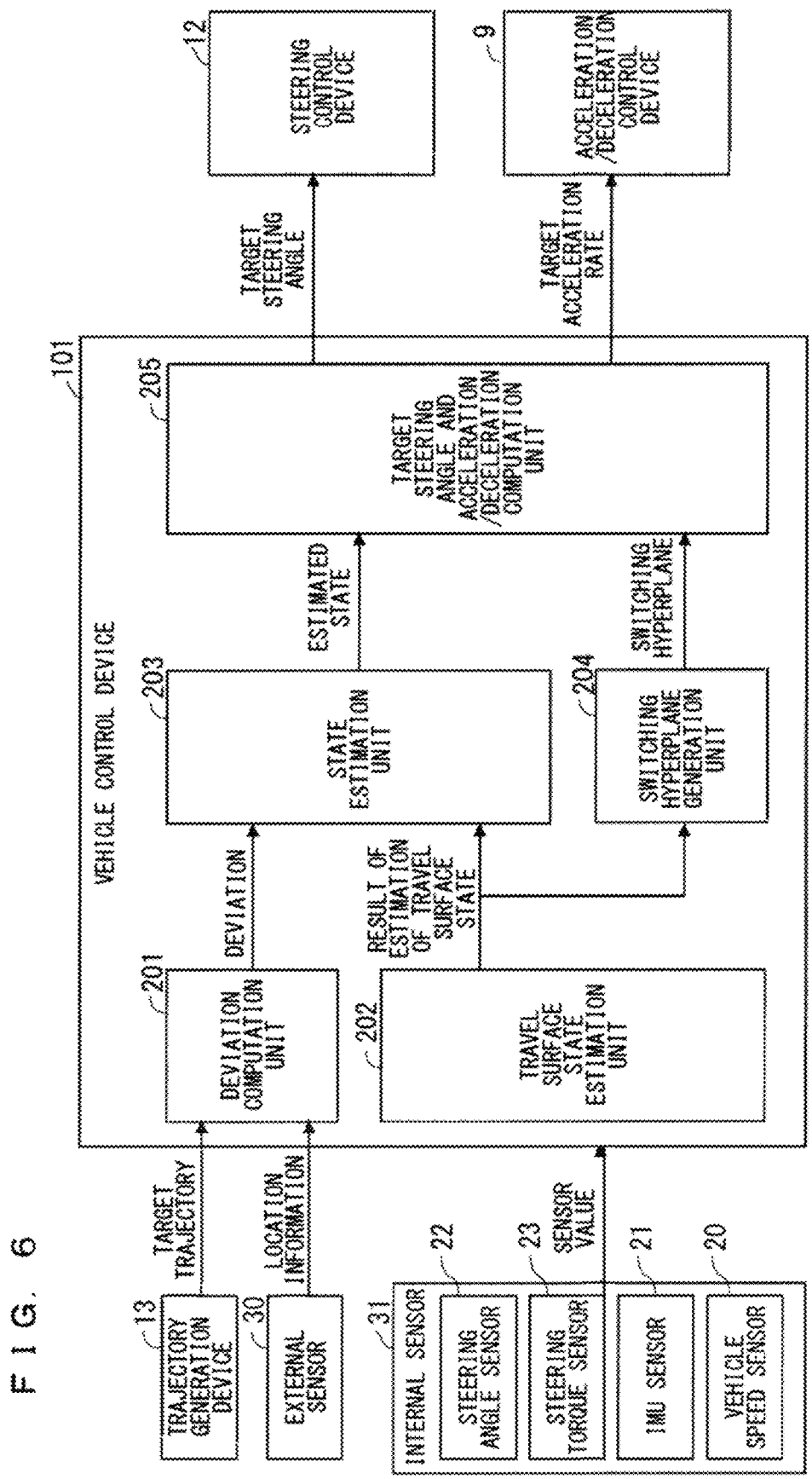
FIG. 6 is a functional block diagram of a vehicle control device according to Embodiment 1.

FIG. 6 is a functional block diagram of the vehicle control device 101 according to Embodiment 1. As shown in FIG. 6, the trajectory generation device 13, the external sensor 30, the internal sensor 31, the steering control device 12, and the acceleration/deceleration control device 9 are connected to the vehicle control device 101.

As described above, the trajectory generation device 13 calculates the target trajectory (the target path and the target vehicle speed) of the vehicle 100. The external sensor 30 includes the camera 24, the radar 25, the GNSS sensor 26, and the like, and outputs information on the location of the vehicle 100 and the like to the vehicle control device 101. The internal sensor 31 includes the vehicle speed sensor 20, the IMU sensor 21, the steering angle sensor 22, the steering torque sensor 23, and the like, and outputs values of outputs of them (sensor values) to the vehicle control device 101.

The vehicle control device 101 includes a deviation computation unit 201, a travel surface state estimation unit 202, a state estimation unit 203, a switching hyperplane generation unit 204, and a target steering angle and acceleration/deceleration computation unit 205.

The deviation computation unit 201 calculates a deviation between an actual trajectory and the target trajectory of the vehicle 100 based on the information on the location of the vehicle 100 output from the external sensor 30, the sensor values output from the internal sensor 31, and the target trajectory of the vehicle 100 output from the trajectory generation device 13. That is to say, the deviation computation unit 201 obtains a deviation between the location of the vehicle 100 and the target path and a deviation between the vehicle speed of the vehicle 100 and the target vehicle speed. More specifically, the vehicle control device 101 calculates the lateral deviation $e_y$ and the deflection angle $e_\theta$ with respect to the target path of the vehicle 100 and $e_v = v_x - v_t$ as the deviation between the target vehicle speed $v_t$ and the vehicle speed $v_x$ of the vehicle 100.

The travel surface state estimation unit 202 estimates a state (hereinafter, referred to as a "travel surface state") of the travel surface on which the vehicle 100 travels, and estimates, from the travel surface state, the cornering stiffness of the vehicle 100. The travel surface state herein represents a state of a portion of the travel surface with which the front wheels 102 and the rear wheels 103 of the vehicle 100 are in contact, and the cornering stiffness has a value differing depending on the travel surface state as described with reference to FIG. 5. The travel surface state estimation unit 202 outputs, as a result of estimation of the travel surface state, the estimated cornering stiffness to the state estimation unit 203 and the switching hyperplane generation unit 204.

In the present embodiment, the travel surface state is classified into the icy surface, the wet surface, and the dry surface, but may be classified in other ways. For example, the travel surface state may be classified into an asphalt surface, a concrete surface, and a brick surface based on a material for the travel surface. Alternatively, in a case where the vehicle 100 is a vehicle traveling indoors, the travel surface state may be classified into a marble surface, a carpet surface, and a wood surface based on the material for the travel surface.

Examples of a method for estimating the cornering stiffness from the travel surface state using the travel surface state estimation unit 202 will be described herein.

One method for estimating the cornering stiffness is a method of using a cornering force model of the travel surface. The cornering force $F_c$ is related to the sideslip angle $\beta$ of the vehicle 100, and the relationship therebetween is modeled as a linear tire model, a magic formula model, and the like, and such a model is referred to as a tire model. Assume that the tire model is represented by an equation (4) below based on the assumption that the cornering force $F_c$ is a function of the sideslip angle $\beta$ in the present embodiment.

[Math 4]

$$F_c = T_f(\beta) \tag{4}$$

The cornering stiffness C can be represented by an equation (5) below because the cornering stiffness C is defined as a slope of $T_f$ when an equation $\beta=0$ is satisfied.

[Math 5]

$$C = \left.\frac{dT_f}{d\beta}\right|_{\beta=0} \tag{5}$$

When the cornering stiffness of the front wheels 102 and the cornering stiffness of the rear wheels 103 can be calculated using the equation (4) and the equation (5), values thereof can be used as $C_f$ and $C_r$ in the equation (1). The tire model can be estimated using the internal sensor 31, the external sensor 30, a Kalman filter, and a particle filter, and a specific method for estimating the tire model is disclosed in "Tire-stiffness estimation by marginalized adaptive particle filter" (Karl Berntorp and Stefano Di Cairano, 2016 IEEE 55th Conference on Decision and Control), for example.

Another method for estimating the cornering stiffness is a method of using an index of the travel surface state. For example, the external sensor 30 has a function of analyzing an image in front of the vehicle 100 captured by the camera 24 to estimate the travel surface state, and outputting an index so that an index "1" is output when a result of estimation is the icy surface, an index "2" is output when the result of estimation is the wet surface, and an index "3" is output when the result of estimation is the dry surface in some cases. In this case, the cornering stiffness $C_f$ and $C_r$ can be estimated by measuring values of the cornering stiffness for respective travel surface states in advance, prestoring information on the cornering stiffness $C_f$ and $C_r$ for each travel surface state using the travel surface state estimation unit 202 as a table as shown in FIG. 7, and reading, from the table, a value of the cornering stiffness $C_f$ and $C_r$ corresponding to an index output from the external sensor 30 using the travel surface state estimation unit 202.

The switching hyperplane generation unit 204 generates the switching hyperplane using the result of estimation of the travel surface state (a result of estimation of the cornering stiffness) from the travel surface state estimation unit 202.

A method for designing the switching hyperplane will be described below. A state equation of the vehicle 100 is herein represented by equations (6).

[Math 6]

$$\dot{x}=Ax+Bu$$

$$y=Cx \qquad (6)$$

In the equations (6), x is an n×1 vector obtained by vertically arranging n states to be controlled, and is referred to as a state vector. Also, u is an m×1 vector obtained by vertically arranging control inputs, and is referred to as an input vector. Furthermore, y is a p×1 vector obtained by vertically arranging p observable amounts, and is referred to as an observation vector. A and B are each a matrix representing dynamics of the state, and A is an n×n matrix, and B is an n×m matrix. C is a p×n matrix representing a relationship between the state vector and the observation vector.

While the equation (1) can be used as the state equation as for the lateral motion of the vehicle 100, a state equation as shown below can be used as for the longitudinal direction of the vehicle 100. That is to say, when the state equation from the target acceleration/deceleration rate $u_a$ to the vehicle speed $v_x$ is modeled as a first order lag system of a time constant $T_a$, the state equation in the longitudinal direction of the vehicle 100 can be modeled as shown in an equation (7) below using a longitudinal acceleration rate $a_x$.

[Math 7]

$$\frac{d}{dt}\begin{bmatrix} v_x \\ a_x \end{bmatrix} = \begin{bmatrix} 0 & 1 \\ 0 & -1/T_a \end{bmatrix}\begin{bmatrix} v_x \\ a_x \end{bmatrix} + \begin{bmatrix} 0 \\ 1/T_a \end{bmatrix} u_a \qquad (7)$$

The equation (7) is represented by an equation (11) using equations (8) to (10) below.

[Math 8]

$$x_x := [v_x \; a_x]^T \qquad (8)$$

[Math 9]

$$A_x := \begin{bmatrix} 0 & 1 \\ 0 & -1/T_a \end{bmatrix} \qquad (9)$$

[Math 10]

$$B_x := \begin{bmatrix} 0 \\ 1/T_a \end{bmatrix} \qquad (10)$$

[Math 11]

$$\dot{x}_x = A_x x_x + B_x u_a \qquad (11)$$

Next, dynamics to be a normative model to achieve desired longitudinal motion of the vehicle 100 are determined as shown in an equation (12) below, where $x_m = [v_m \; a_m]^T$ is a normative state.

[Math 12]

$$\dot{x}_m = A_m x_m + B_m v_t \qquad (12)$$

$A_m$ and $B_m$ in the equation (12) can be represented by equations (13) using parameters $\omega_n$ and $\zeta$ when a desired response is designed as a second order lag system, for example.

[Math 13]

$$A_m = \begin{bmatrix} 0 & 1 \\ -\omega_n^2 & -2\zeta\omega_n \end{bmatrix} \qquad (13)$$

$$B_m = \begin{bmatrix} 0 \\ \omega_n^2 \end{bmatrix}$$

A state equation relating to an error $e_a$ between the normative state and the current state is derived using them. Dynamics of the state vector $e_x = [e_v \; e_a]^T$ obtained by bringing them together can be represented by an equation (14) below, where $e_v = v_x - v_m$ and $e_a = a_x - a_m$.

[Math 14]

$$\dot{e}_x = A_m e_x + (A_m - A)x + B_m r - B u_a \qquad (14)$$

The vehicle 100 can follow the target vehicle speed $v_t$ by designing a sliding mode control system so that $e_x$ is zero. In the present embodiment, a state equation in which the lateral motion and the longitudinal motion are integrated using the equations (2) and the equation (14) is used by representing the state vector by an equation (15) below.

[Math 15]

$$x := [e_y \; \dot{e}_y \; e_\theta \; \dot{e}_\theta \; e_v \; e_a]^T \qquad (15)$$

That is to say, a state equation represented by an equation (16) below is used in the present embodiment.

[Math 16]

$$\dot{x} = \begin{bmatrix} A_l(v_x, C_f, C_r) & 0_{4\times2} \\ 0_{2\times4} & A_x \end{bmatrix} x + \begin{bmatrix} B_l(C_f, C_r) & 0_{1\times1} \\ 0_{2\times1} & B_x \end{bmatrix} \begin{bmatrix} \delta \\ u_a \end{bmatrix} \qquad (16)$$

The equation (16) is represented by equations (17) below.

[Math 17]

$$A := \begin{bmatrix} A_l(v_x, C_f, C_r) & 0_{4\times2} \\ 0_{2\times4} & A_x \end{bmatrix} \qquad (17)$$

$$B := \begin{bmatrix} B_l(C_f, C_r) & 0_{1\times1} \\ 0_{2\times1} & B_x \end{bmatrix}$$

$$u := \begin{bmatrix} \delta \\ u_a \end{bmatrix}$$

The switching hyperplane CT is defined as shown in an equation (18) using the state vector x.

[Math 18]

$$\sigma = Sx \qquad (18)$$

In the equation (18), S is a coefficient vector relating to the switching hyperplane, and is an m×n matrix.

Designing the switching hyperplane means designing S. While various methods are proposed as a method for designing S, a method of obtaining an optimum switching hyperplane minimizing a change in state will be described herein.

The method of obtaining optimum S minimizing the change in state will be described below. An evaluation function is represented by an equation (19).

[Math 19]

$$J=\int_{t_s}^{t} x^T Q x \, dt \quad (19)$$

In the equation (19), $t_s$ is a time at which a sliding mode has occurred, and Q is a matrix satisfying equations (20).

[Math 20]

$$Q = \begin{bmatrix} Q_{11} & Q_{12} \\ Q_{21} & Q_{22} \end{bmatrix} \quad Q_{12}^T = Q_{21}, Q > 0 \quad (20)$$

The equation (19) can be written as an equation (21) when an auxiliary variable $v=x_2+Q_{22}^{-1}Q_{12}^T x_1$ is introduced.

[Math 21]

$$J=\int_{t_s}^{t}(x_1^T Q_{11}^* x_1 + v^T Q_{22} v)dt \quad (21)$$

$Q_{11}^*$ in the equation (21) is as shown in an equation (22).

[Math 22]

$$Q_{11}^* = Q_{11} - Q_{12} Q_{22}^{-1} Q_{12}^T \quad (22)$$

In the sliding mode, a state variable can be written as an equation (24) using the above-mentioned auxiliary variable and an equation (23) below.

[Math 23]

$$A_{11}^* = A_{11} - Q_{22}^{-1} Q_{12}^T \quad (23)$$

[Math 24]

$$\dot{x}_1 = A_{11}^* x_1 + A_{12} v \quad (24)$$

The optimum switching hyperplane is thus a solution of an optimum control problem using an equation (25) below in the sliding mode.

[Math 25]

$$J=\int_{t_s}^{t}(x_1^T Q_{11}^* x_1 + v^T Q_{22} v)dt$$

$$\dot{x}_1 = A_{11}^* x_1 + A_{12} v \quad (25)$$

A control input v minimizing J is represented by an equation (27) using a positive definite symmetric unique solution P of a Riccati equation as an equation (26).

[Math 26]

$$PA_{11}^* + A_{11}^* P - PA_{12} Q_{22}^{-1} A_{12}^T P + Q_{11}^* = 0 \quad (26)$$

[Math 27]

$$v = -Q_{22}^{-1} A_{12}^T P x_1 \quad (27)$$

The optimum switching hyperplane is thus obtained when an equation $\sigma=[(A_{12}^T P+Q_{12}^T)Q_{22}]x$ is satisfied, that is, an equation $S=[(A_{12}^T P+Q_{12}^T)Q_{22}]$ is satisfied.

While optimum S can be obtained as described above, motion of the vehicle 100 is dependent on the travel state (e.g., vehicle speed) of the vehicle 100 and the travel surface (e.g., cornering stiffness) as described above. Thus, when S is designed so that they are constant, the state vector x cannot reach the sliding mode, and, at worst, the vehicle 100 can be destabilized. In the present embodiment, robust control of the vehicle 100 is achieved by changing S when the travel state of the vehicle 100 and the travel surface change.

Figure 8:
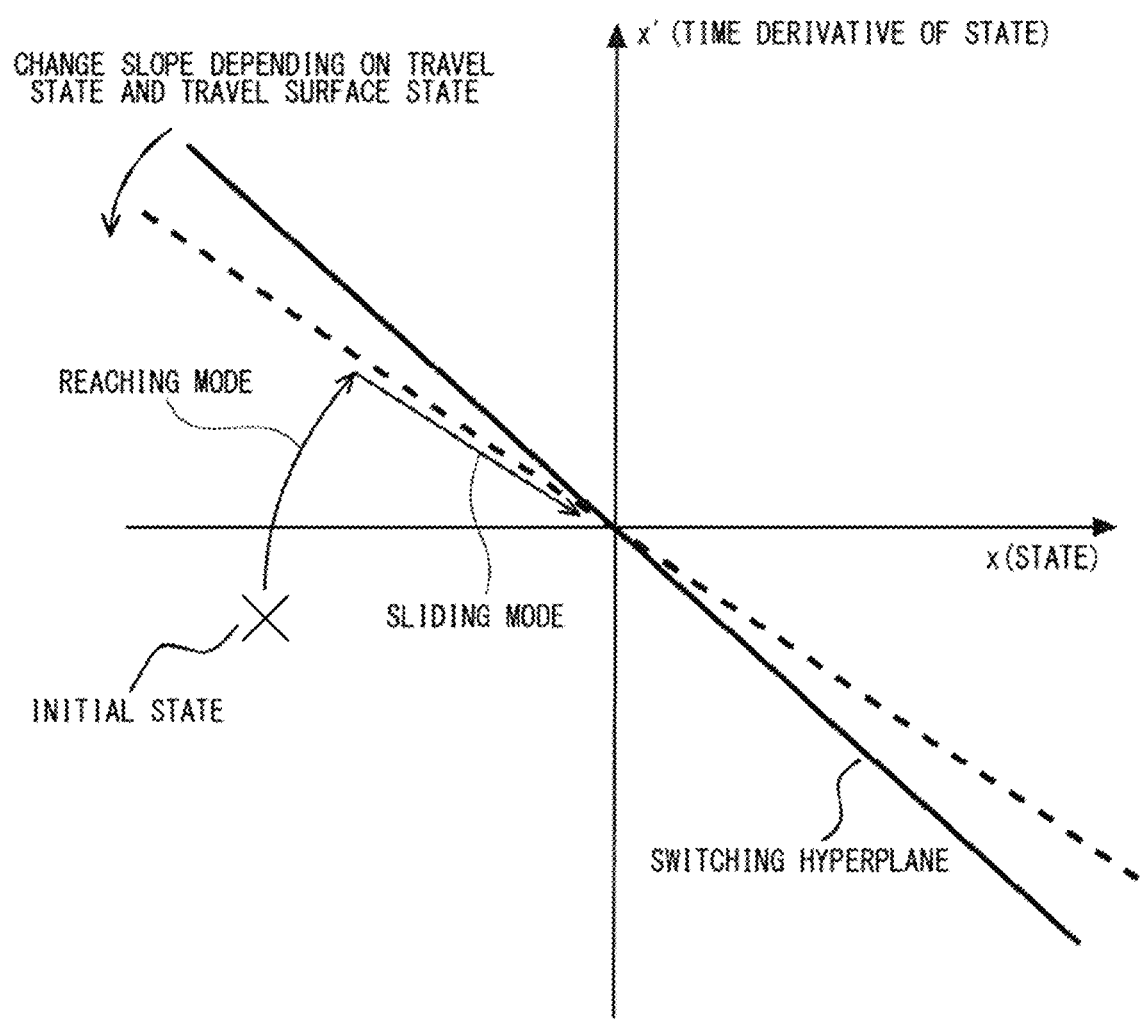
FIG. 8 shows a switching hyperplane changed depending on a travel state and the travel surface state.

FIG. 8 shows a way to change the switching hyperplane depending on the travel state and the travel surface. In FIG. 8, a horizontal axis represents the state, and a vertical axis represents a time derivative of the state. A diagram as shown in FIG. 8 is referred to as a phase space, and is used for sliding mode control designing. In sliding mode control, a mode until the state reaches the sliding mode from an initial state (a state at the start of control) is referred to as a reaching mode.

In the present embodiment, a state of the vehicle 100 is likely to reach the switching hyperplane by changing a slope of the switching hyperplane depending on the travel state and the travel surface as shown in FIG. 8. A method for changing the switching hyperplane depending on the travel state and the travel surface will be described below.

One method for changing the switching hyperplane is a method of designing the switching hyperplane in real time. The switching hyperplane generation unit 204 can acquire a result of estimation of a current travel surface state from the travel surface state estimation unit 202 and a current travel state of the vehicle 100 output from the internal sensor 31 in real time. The switching hyperplane can thus be obtained in real time using the above-mentioned method for calculating the switching hyperplane.

Another method for changing the switching hyperplane is a method of using a switching hyperplane map. In this method, a plurality of switching hyperplanes corresponding to respective combinations of the travel surface state and the travel state are obtained in advance from the cornering stiffness for each travel surface state and a conceivable range of the travel state of the vehicle 100, and the obtained switching hyperplanes are held by the switching hyperplane generation unit 204 as a map.

Figure 9:
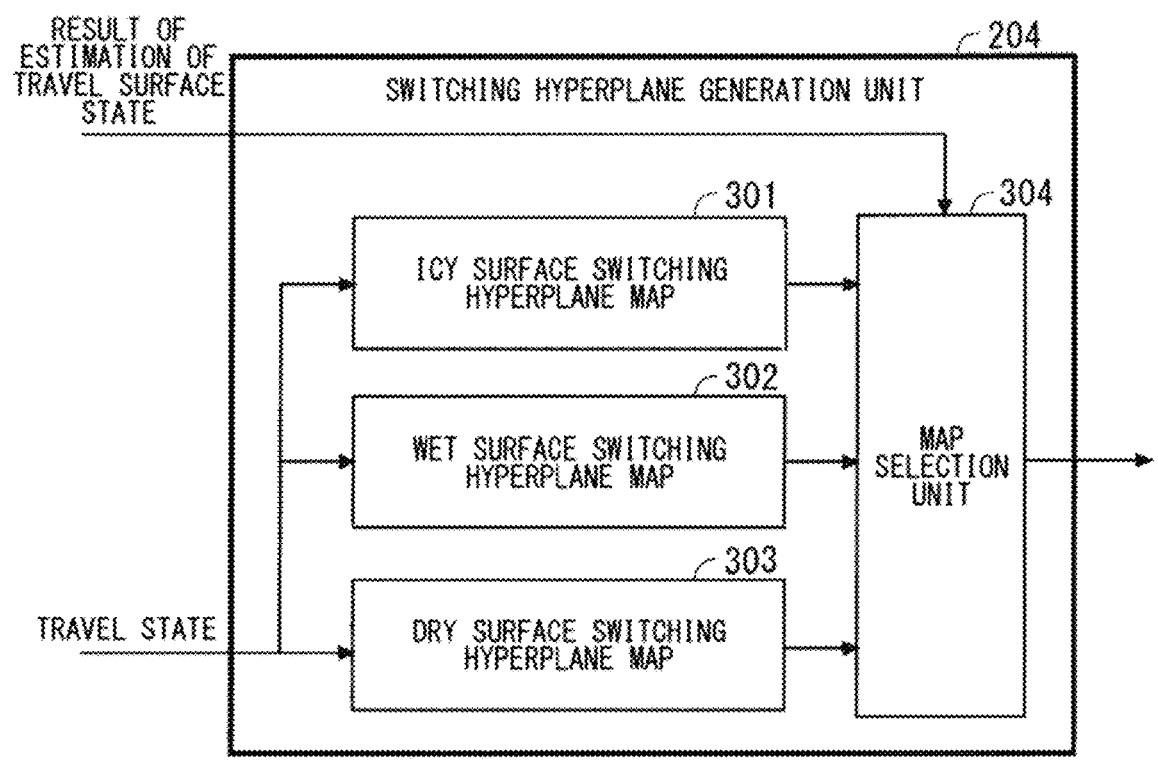
FIG. 9 shows an example of a configuration of a switching hyperplane generation unit.

For example, as shown in FIG. 9, the switching hyperplane generation unit 204 may include an icy surface switching hyperplane map 301 as a map of switching hyperplanes for the icy surface, a wet surface switching hyperplane map 302 as a map of switching hyperplanes for the wet surface, a dry surface switching hyperplane map 303 as a map of switching hyperplanes for the dry surface, and a map selection unit 304 to select any of the maps. In the switching hyperplane generation unit 204 in FIG. 9, the map selection unit 304 selects, at actual travel of the vehicle 100, a map corresponding to the current travel surface state from the icy surface switching hyperplane map 301, the wet surface switching hyperplane map 302, and the dry surface switching hyperplane map 303 based on the result of estimation of the travel surface state obtained in real time. The switching hyperplane generation unit 204 refers to the selected map, and reads, from the map, a switching hyperplane corresponding to the current travel state of the vehicle 100 to generate the switching hyperplane. The switching hyperplane generation unit 204 can thus generate the switching hyperplane suitable for the travel state of the vehicle 100 and the travel surface state in real time.

As described above, the vehicle control device 101 according to Embodiment 1 changes the switching hyperplane depending on the travel state of the vehicle 100 and the travel surface state, so that the state of the vehicle 100 is likely to reach the sliding mode, and, as a result, robust control of the vehicle 100 can be achieved.

Referring back to FIG. 6, the state estimation unit 203 estimates a state to be controlled of the vehicle 100 (state of the vehicle 100 used by the target steering angle and acceleration/deceleration computation unit 205) based on the deviation between the actual trajectory and the target trajectory of the vehicle 100 calculated by the deviation computation unit 201. That is to say, the state vector x of the state equation is obtained. When the state equation is represented by the equations (6), an observer, a Kalman filter, and a particle filter are often used as methods for obtaining the state vector x, for example. The state estimation unit 203 outputs the state as estimated to the target steering angle and acceleration/deceleration computation unit 205 as an estimated state.

The target steering angle and acceleration/deceleration computation unit 205 functions as a control input computation unit to obtain the control input of the vehicle 100, that is, the target steering angle and the target acceleration/deceleration rate using the estimated state input from the state estimation unit 203 and the switching hyperplane generated by the switching hyperplane generation unit 204. The control input u in sliding mode control can be calculated by an equation (28) below.

[Math 28]

$$u = u_{eq} + u_{nl} \tag{28}$$

In the equation (28), $u_{eq}$ and $u_{nl}$ are respectively obtained by an equation (29) and an equation (30).

[Math 29]

$$u_{eq} = -(SB)^{-1} SAx \tag{29}$$

[Math 30]

$$u_{nl} = (SB)^{-1} \dot{\sigma} \tag{30}$$

Herein, $u_{nl}$ is an input for causing the state to reach the sliding mode, and is referred to as a reaching law input. Furthermore, $u_{eq}$ is an input for maintaining the state in the sliding mode, and is referred to as an equivalent control input. Various methods are proposed as a method for determining σ', but it is easy to use an equation (31) below.

[Math 31]

$$\dot{\sigma} = -G \, \text{sgn}(\sigma) \tag{31}$$

In the equation (31), G is a coefficient matrix, and sgn is a sign function.

As described above, the target steering angle and acceleration/deceleration computation unit 205 sums the reaching law input $u_{nl}$ and the equivalent control input $u_{eq}$ to calculate the control input u. The control input u obtained by the equation (28) includes the target steering angle δ and the target acceleration/deceleration rate $u_a$ as in the equation (16). Thus, the target steering angle δ and the target acceleration/deceleration rate $u_a$ are respectively transmitted to the steering control device 12 and the acceleration/deceleration control device 9, and the steering control device 12 and the acceleration/deceleration control device 9 achieve desired motion of the vehicle 100.

As described above, according to the vehicle control device 101 according to Embodiment 1, robust control of the vehicle 100 can be achieved on the travel state and the travel surface.

Although the state equation in which the lateral motion and the longitudinal motion of the vehicle 100 are integrated is used in the equation (15), the switching hyperplane may separately be designed for the equation (1) as the state equation for the lateral motion of the vehicle 100 and the equation (14) as the state equation for the longitudinal motion of the vehicle 100 to calculate control inputs.

Embodiment 2

Figure 10:
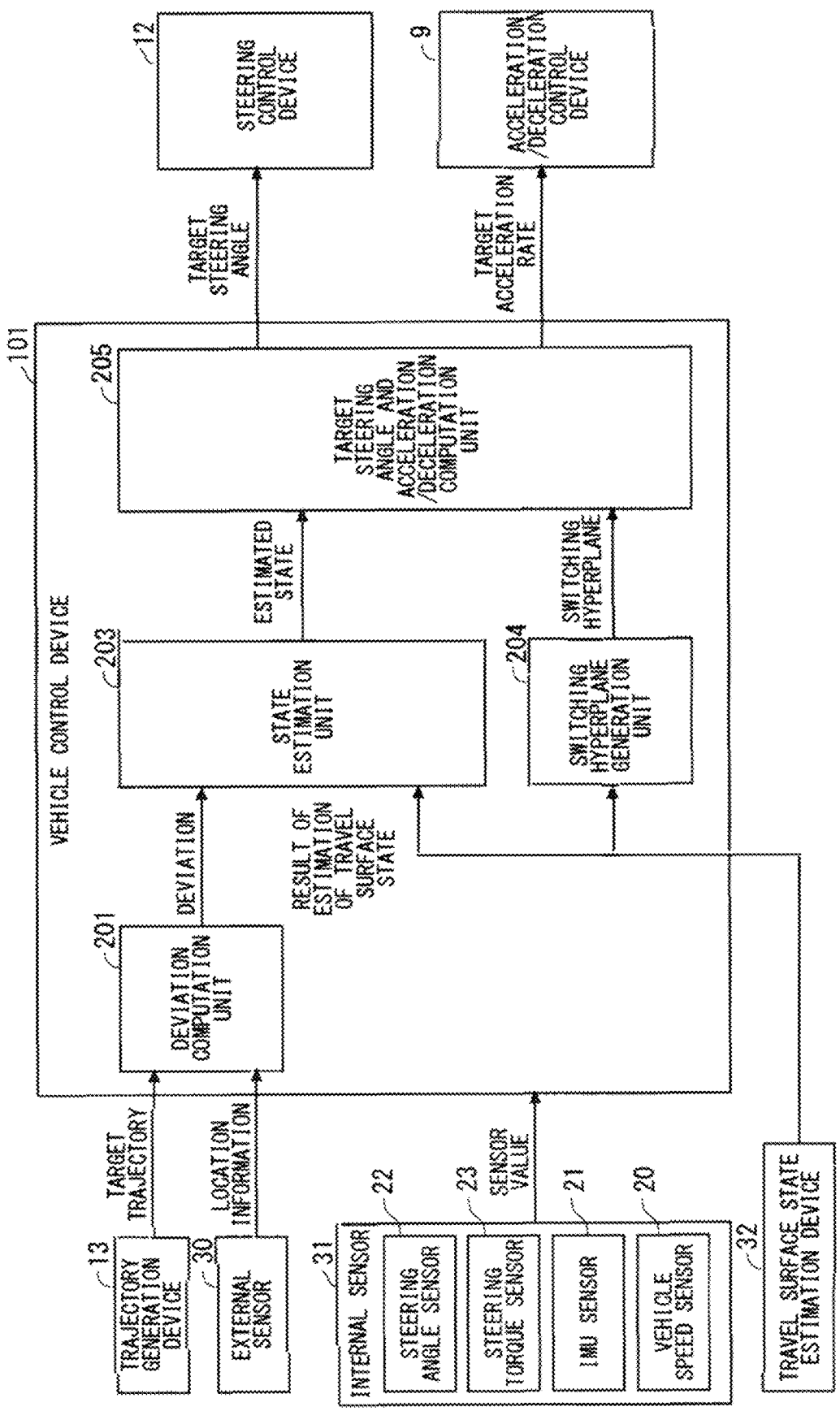
FIG. 10 is a functional block diagram of a vehicle control device according to Embodiment 2.

FIG. 10 is a functional block diagram of the vehicle control device 101 according to Embodiment 2. A configuration in FIG. 10 is a configuration in which the travel surface state estimation unit 202 of the vehicle control device 101 in Embodiment 1 (FIG. 6) has been replaced by a travel surface state estimation device 32 externally connected to the vehicle control device 101. The travel surface state estimation device 32 has the function of estimating the travel surface state as with the travel surface state estimation unit 202 in Embodiment 1, and externally provides the result of estimation to the vehicle control device 101.

According to the configuration in Embodiment 2, in addition to an effect similar to the effect obtained in Embodiment 1, an effect of reducing a calculation load on the vehicle control device 101 can be obtained because the vehicle control device 101 is not required to estimate the travel surface state.

Embodiment 3

Figure 11:
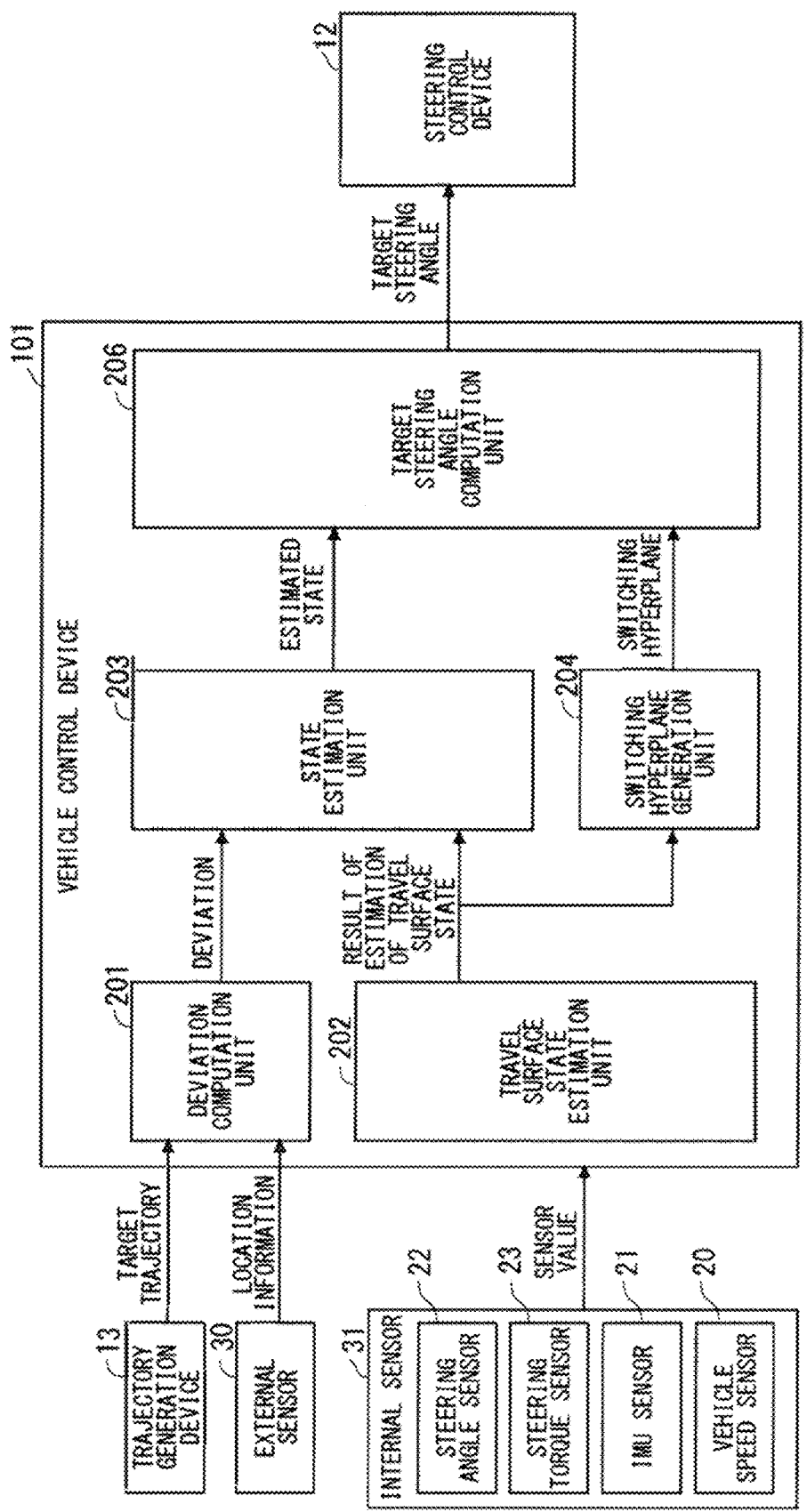
FIG. 11 is a functional block diagram of a vehicle control device according to Embodiment 3.

FIG. 11 is a functional block diagram of the vehicle control device 101 according to Embodiment 3. A configuration in FIG. 11 is a configuration in which the target steering angle and acceleration/deceleration computation unit 205 as the control input computation unit in the configuration in Embodiment 1 (FIG. 6) has been replaced by a target steering angle computation unit 206. Furthermore, the acceleration/deceleration control device 9 is not connected to the vehicle control device 101.

While the target steering angle and acceleration/deceleration computation unit 205 in Embodiment 1 calculates both the target steering angle and the target acceleration/deceleration rate as control inputs of the vehicle 100, the target steering angle computation unit 206 in Embodiment 3 calculates only the target steering angle, and outputs the calculated target steering angle to the steering control device 12. The present embodiment takes into account a case where an output of the trajectory generation device 13 is only the target path, and, in this case, the vehicle control device 101 controls only the lateral motion of the vehicle 100.

In the present embodiment, the state estimation unit 203 and the switching hyperplane generation unit 204 perform calculation using the equation (1) as the state equation for the lateral motion of the vehicle 100. The target steering angle computation unit 206 calculates the target steering angle as the control input using the estimated state output from the state estimation unit 203 and the switching hyperplane designed by the switching hyperplane generation unit 204.

According to the vehicle control device 101 in Embodiment 3, robust control of the vehicle 100 can be achieved even when the output of the trajectory generation device 13 is only the target path.

Embodiment 4

Figure 12:
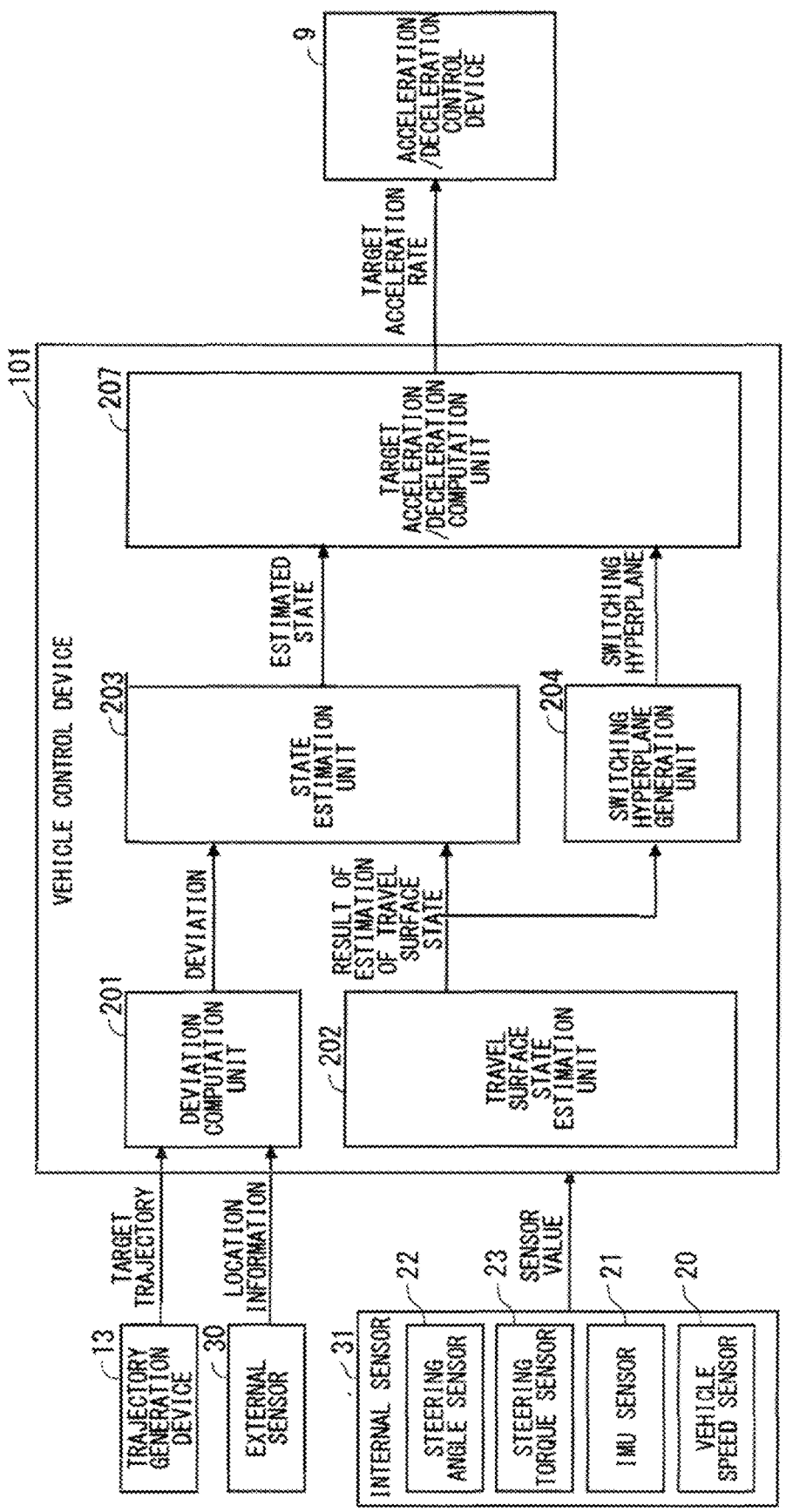
FIG. 12 is a functional block diagram of a vehicle control device according to Embodiment 4.

FIG. 12 is a functional block diagram of the vehicle control device 101 according to Embodiment 4. A configuration in FIG. 12 is a configuration in which the target steering angle and acceleration/deceleration computation unit 205 as the control input computation unit in the configuration in Embodiment 1 (FIG. 6) has been replaced by a target acceleration/deceleration computation unit 207. Furthermore, the steering control device 12 is not connected to the vehicle control device 101.

While the target steering angle and acceleration/deceleration computation unit 205 in Embodiment 1 calculates both the target steering angle and the target acceleration/deceleration rate as the control inputs of the vehicle 100, the target acceleration/deceleration computation unit 207 in Embodiment 4 calculates only the target acceleration/deceleration, and outputs the calculated target acceleration/deceleration to the acceleration/deceleration control device 9. The present embodiment takes into account a case where the output of the trajectory generation device 13 is only the target vehicle speed, and, in this case, the vehicle control device 101 controls only the longitudinal motion of the vehicle 100.

In the present embodiment, the state estimation unit 203 and the switching hyperplane generation unit 204 perform calculation using the equation (14) as the state equation for the longitudinal motion of the vehicle 100. The target acceleration/deceleration computation unit 207 calculates the target acceleration/deceleration rate as the control input using the estimated state output from the state estimation unit 203 and the switching hyperplane designed by the switching hyperplane generation unit 204.

According to the vehicle control device 101 in Embodiment 4, robust control of the vehicle 100 can be achieved even when the output of the trajectory generation device 13 is only the target vehicle speed.

<Modifications>

When the steering control device 12 can drive the steering shaft 2 to follow a target torque, the vehicle control device 101 may output not the target steering angle but a target steering torque to the steering control device 12.

When the acceleration/deceleration control device 9 can control the vehicle drive device 7 and the brake control device 10 to follow the target vehicle speed, the vehicle control device 101 may output not the target acceleration/deceleration rate but the target vehicle speed to the acceleration/deceleration control device 9. In this case, the target vehicle speed can be calculated by integrating the target acceleration/deceleration rate.

In description made above, the front wheels 102 are turned, but the rear wheels 103 can also be turned simultaneously. The above-mentioned embodiments are applicable to steering control of the rear wheels 103.

Examples of Hardware Configuration

Figure 13:
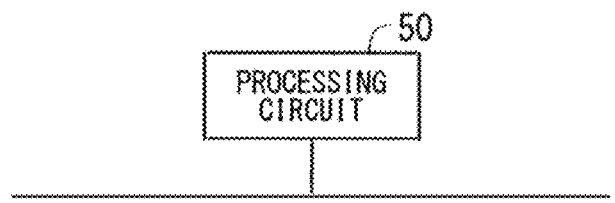
FIG. 13 shows an example of a hardware configuration of the vehicle control device.
Figure 14:
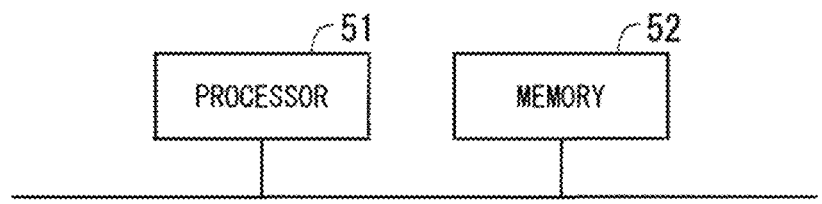
FIG. 14 shows an example of the hardware configuration of the vehicle control device.

FIGS. 13 and 14 show examples of a hardware configuration of the vehicle control device 101. Functions of the components of each of the vehicle control devices 101 shown in FIGS. 6 and 10 to 12 are achieved by a processing circuit 50 shown in FIG. 13, for example. That is to say, the vehicle control device 101 includes the processing circuit 50 to generate a switching hyperplane based on a travel state of the vehicle 100 and cornering stiffness dependent on a travel surface state as a state of a road surface on which the vehicle 100 travels, estimate a state to be controlled of the vehicle 100 based on a deviation between a target trajectory and an actual trajectory of the vehicle 100, and calculate a control input for controlling at least one of steering and a vehicle speed of the vehicle 100 based on the generated switching hyperplane and the estimated state. The processing circuit 50 may be dedicated hardware, or may be configured using a processor (also referred to as a central processing unit (CPU), a processing unit, an arithmetic unit, a microprocessor, a microcomputer, and a digital signal processor (DSP)) to execute a program stored in memory.

When the processing circuit 50 is the dedicated hardware, the processing circuit 50 corresponds to a single circuit, a composite circuit, a programmed processor, a parallel programmed processor, an application specific integrated circuit (ASIC), a field-programmable gate array (FPGA), and a combination thereof, for example. The functions of the components of the vehicle control device 101 may be achieved by discrete processing circuits, or may collectively be achieved by a single processing circuit.

FIG. 14 shows an example of the hardware configuration of the vehicle control device 101 when the processing circuit 50 is configured using a processor 51 to execute a program. In this case, the functions of the components of the vehicle control device 101 are achieved by software and the like (software, firmware, or a combination of software and firmware). Software and the like are described as a program, and stored in memory 52. The processor 51 reads and executes the program stored in the memory 52 to achieve functions of respective units. That is to say, the vehicle control device 101 includes the memory 52 to store a program which, when executed by the processor 51, results in performance of processing to generate a switching hyperplane based on a travel state of the vehicle 100 and cornering stiffness dependent on a travel surface state as a state of a road surface on which the vehicle 100 travels, estimate a state to be controlled of the vehicle 100 based on a deviation between a target trajectory and an actual trajectory of the vehicle 100, and calculate a control input for controlling at least one of steering and a vehicle speed of the vehicle 100 based on the generated switching hyperplane and the estimated state. In other words, the program causes a computer to execute procedures or methods of operation of the components of the vehicle control device 101.

The memory 52 herein may be, for example, nonvolatile or volatile semiconductor memory, such as random access memory (RAM), read only memory (ROM), flash memory, erasable programmable read only memory (EPROM), and electrically erasable programmable read only memory (EEPROM), a hard disk drive (HDD), a magnetic disk, a flexible disk, an optical disc, a compact disc, a mini disc, a digital versatile disc (DVD), a drive device thereof, and the like or any storage medium to be used in the future.

A configuration in which the functions of the components of the vehicle control device 101 are achieved either by hardware or by software is described above. A configuration, however, is not limited to this configuration, and some of the components of the vehicle control device 101 may be achieved by dedicated hardware, and the other components may be achieved by software and the like. For example, functions of some of the components can be achieved by the processing circuit 50 as the dedicated hardware, and functions of the other components can be achieved by the processing circuit 50 as the processor 51 reading and executing the program stored in the memory 52.

As described above, the vehicle control device 101 can achieve the above-mentioned functions by hardware, software, or a combination thereof.

Embodiments of the present invention can freely be combined with each other, and can be modified or omitted as appropriate within the scope of the present invention.

While the present invention has been described in detail, the foregoing description is in all aspects illustrative and not restrictive. It is understood that numerous unillustrated modifications can be devised without departing from the scope of the present invention.

EXPLANATION OF REFERENCE SIGNS 1 steering wheel, 2 steering shaft, 3 electric motor, 4 rack and pinion mechanism, 5 tie rod, 6 front knuckle, 7 vehicle drive device, 8 shaft, 9 acceleration/deceleration control device, 10 brake control device, 11 brake, 12 steering control device, 13 trajectory generation device, 14 pinion shaft, 15 rack shaft, 20 vehicle speed sensor, 21 IMU sensor, 22 steering angle sensor, 23 steering torque sensor, 24 camera, 25 radar, 26 GNSS sensor, 27 navigation device, 30 external sensor, 31 internal sensor, 32 travel surface state estimation device, 50 processing circuit, 51 processor, 52 memory, 100 vehicle, 101 vehicle control device, 102 front wheel, 103 rear wheel, 201 deviation computation unit, 202 travel surface state estimation unit, 203 state estimation unit, 204 switching hyperplane generation unit, 205 target steering angle and acceleration/deceleration computation unit, 206 target steering angle computation unit, 207 target acceleration/deceleration computation unit, 301 icy surface switching hyperplane map, 302 wet surface switching hyperplane map, 303 dry surface switching hyperplane map, 304 map selection unit.

The invention claimed is:

1. A vehicle control device comprising:
processing circuitry configured as a switching hyperplane generator to generate a switching hyperplane based on a travel state of a vehicle and cornering stiffness dependent on a travel surface state as a state of a travel surface on which the vehicle travels, the switching hyperplane being a plane in a phase space having an axis representing a time derivative of the travel state of the vehicle;
the processing circuitry further configured as a deviation computator to calculate a deviation between a target trajectory and an actual trajectory of the vehicle;
the processing circuitry further configured as a state estimator to estimate an estimated state of the vehicle to be controlled based on the deviation calculated by the deviation computator; and
the processing circuitry further configured as a control input computator to control at least one of a steering control device and an acceleration/deceleration control device to thereby control at least one of steering and a vehicle speed of the vehicle based on the switching hyperplane generated by the switching hyperplane generator and an estimated state as the state estimated by the state estimator.

2. The vehicle control device according to claim 1, wherein
the travel state of the vehicle includes a vehicle speed.

3. The vehicle control device according to claim 1, wherein the processing circuitry is further configured as a travel surface state estimator to estimate the travel surface state for the vehicle, and estimate the cornering stiffness dependent on the travel surface state, the travel surface state being a state of a portion of a travel surface with which front wheels and rear wheels of the vehicle are currently in contact.

4. The vehicle control device according to claim 3, wherein
the travel surface state estimator estimates the cornering stiffness based on at least one of an output of an internal sensor to detect the travel state of the vehicle and an output of an external sensor to detect a condition around the vehicle.

5. The vehicle control device according to claim 3, wherein
the travel surface state estimator prestores a plurality of values of cornering stiffness corresponding to respective travel surface states, selects one of the values of cornering stiffness corresponding to the estimated travel surface state, and outputs the selected value of cornering stiffness.

6. The vehicle control device according to claim 3, wherein
the travel surface state estimated by the travel surface state estimator includes any of an icy surface, a wet surface, and a dry surface.

7. The vehicle control device according to claim 3, wherein
the travel surface state estimator estimates the travel surface state based on a material for the travel surface on which the vehicle travels.

8. The vehicle control device according to claim 1, wherein
the control input computator calculates, as the control input, a target steering angle or a target steering torque.

9. The vehicle control device according to claim 1, wherein
the control input computator calculates, as the control input, a target acceleration/deceleration rate or a target vehicle speed.

10. The vehicle control device according to claim 1, wherein
the control input computator calculates, as the control input, a target steering angle or a target steering torque and a target acceleration/deceleration rate or a target vehicle speed.

11. The vehicle control device according to claim 1, wherein
the deviation computator calculates, as the deviation relating to lateral motion of the vehicle, a lateral deviation and a deflection angle with respect to a target path of the vehicle, and calculates, as the deviation relating to longitudinal motion of the vehicle, an error between a current state and a normative state of a vehicle speed and an acceleration rate of the vehicle represented using a normative model.

12. The vehicle control device according to claim 1, wherein
the switching hyperplane generator generates the switching hyperplane in real time based on a current travel state of the vehicle and a current travel surface state.

13. The vehicle control device according to claim 1, wherein
the switching hyperplane generator holds, as a map, a plurality of switching hyperplanes corresponding to respective combinations of the travel state of the vehicle and the travel surface state, and
the switching hyperplane generator generates the switching hyperplane by reading, from the map, a switching hyperplane corresponding to a current travel state of the vehicle and a current travel surface state.

14. The vehicle control device according to claim 1, wherein
the control input computator obtains a reaching law input and an equivalent control input using the estimated state estimated by the state estimator, a state equation of the vehicle, and the switching hyperplane generated by the switching hyperplane generator, and sums the reaching law input and the equivalent control input to calculate the control input, the reaching law input being an input for causing the state of the vehicle to reach the switching hyperplane, the equivalent control input being an input for maintaining the state of the vehicle on the switching hyperplane.

15. A vehicle control method comprising:
generating a switching hyperplane based on a travel state of a vehicle and cornering stiffness dependent on a travel surface state as a state of a travel surface on which the vehicle travels, the switching hyperplane being a plane in a phase space having an axis representing a time derivative of the travel state of the vehicle;
calculating a deviation between a target trajectory and an actual trajectory of the vehicle;
estimating an estimated state of the vehicle to be controlled based on the deviation calculated using the deviation; and
controlling at least one of a steering control device and an acceleration/deceleration control device to thereby control at least one of steering and a vehicle speed of the vehicle based on the switching hyperplane and an estimated state to be controlled of the vehicle.

16. The vehicle control device according to claim 1, wherein
the processing circuitry is further configured as the control input computator to calculate the control input for controlling at least one of the steering of the vehicle and the speed of the vehicle so that the estimated state of the vehicle to be controlled is constrained to remain on the switching hyperplane generated by the switching hyperplane generator.

17. The vehicle control method according to claim 15, wherein
the control input for controlling at least one of steering and the vehicle speed of the vehicle is calculated so that the estimated state of the vehicle to be controlled is constrained to remain on the switching hyperplane.

18. The vehicle control method according to claim 15, further comprising:
controlling at least one of the steering of the vehicle and the speed of the vehicle based on the calculated control input.

19. The vehicle control method according to claim 15, further comprising:
estimating the travel surface state for the vehicle, the travel surface state being a state of a portion of a travel surface with which front wheels and rear wheels of the vehicle are currently in contact; and
estimating a cornering stiffness dependent on the travel surface state.

20. A vehicle comprising:
a vehicle control device including processing circuitry configured as
a switching hyperplane generator to generate a switching hyperplane based on a travel state of the vehicle and the estimated cornering stiffness, the switching hyperplane being a plane in a phase space having an axis representing a time derivative of the travel state of the vehicle,
a deviation computator to calculate a deviation between a target trajectory and an actual trajectory of the vehicle,
a state estimator to estimate a state to be controlled of the vehicle based on the deviation calculated by the deviation computator, and
a control input computator to calculate a control input for controlling at least one of steering and a vehicle speed of the vehicle based on the switching hyperplane generated by the switching hyperplane generator and an estimated state as the state estimated by the state estimator;
a steering control device configured to control a steering of the vehicle based on the control input; and
an acceleration/deceleration control device configured to control a vehicle speed of the vehicle based on the control input.

21. The vehicle according to claim 20, wherein
the processing circuitry is further configured as the control input computator to calculate the control input for controlling at least one of steering and the vehicle speed of the vehicle so that the estimated state of the vehicle to be controlled is constrained to remain on the switching hyperplane generated by the switching hyperplane generator.

* * * * *